United States Patent [19]
Partyka

[11] Patent Number: 6,058,137
[45] Date of Patent: May 2, 2000

[54] FREQUENCY HOPPING SYSTEM FOR INTERMITTENT TRANSMISSION

[76] Inventor: Andrzej Partyka, 370 Finch La., Bedminster, N.J. 07921

[21] Appl. No.: 08/931,089

[22] Filed: Sep. 15, 1997

[51] Int. Cl.$^7$ ....................................................... H04B 1/69
[52] U.S. Cl. .............................................................. 375/201
[58] Field of Search .................................. 375/201, 202, 375/203

[56] References Cited

U.S. PATENT DOCUMENTS

| | | | |
|---|---|---|---|
| 4,435,821 | 3/1984 | Ito et al. | 375/202 |
| 4,606,041 | 8/1986 | Kadin | 375/202 |
| 4,612,652 | 9/1986 | Kadin | 375/202 |
| 5,610,907 | 3/1997 | Barrett | 370/342 |
| 5,659,303 | 8/1997 | Adair, Jr. | 340/870.18 |

*Primary Examiner*—Stephen Chin
*Assistant Examiner*—Lenny Jiang

[57] ABSTRACT

A radio transmission system including many radio transmitters using frequency hopping carriers to intermittently transmit very short messages indicative of status of sensors associated with the transmitters. In operation, a time interval generator included in a transmitter generates pulses activating the transmitter at time intervals according to a predetermined algorithm. When activated, the transmitter transmits a message at one or several different frequencies. The frequencies are changed according to a predetermined algorithm and preferably differ for each subsequent transmission. Alternatively, when an abnormal sensor status is detected, the transmitter transmits repeated messages at a plurality of predetermined alarm frequencies for a predetermined time regardless of the time interval generator. The system also includes one or more receivers containing a plurality of memory registers to hold digital data indicative of (a) the time and (b) the frequency of the next transmission occurrence independently for each transmitter. The registers are programmed separately for each transmitter based on the time, frequency, and the content of the received messages.

45 Claims, 4 Drawing Sheets

|    | 0   | 1   | 2   | 3   | 4   | 5   | 6    | 7    |
|----|-----|-----|-----|-----|-----|-----|------|------|
| 0  | f0  | f16 | f32 | f48 | f64 | f80 | f96  | f112 |
| 1  | f1  | f17 | f33 | f49 | f65 | f81 | f97  | f113 |
| 2  | f2  | f18 | f34 | f50 | f66 | f82 | f98  | f114 |
| 3  | f3  | f19 | f35 | f51 | f67 | f83 | f99  | f115 |
| 4  | f4  | f20 | f36 | f52 | f68 | f84 | f100 | f116 |
| 5  | f5  | f21 | f37 | f53 | f69 | f85 | f101 | f117 |
| 6  | f6  | f22 | f38 | f54 | f70 | f86 | f102 | f118 |
| 7  | f7  | f23 | f39 | f55 | f71 | f87 | f103 | f119 |
| 8  | f8  | f24 | f40 | f56 | f72 | f88 | f104 | f120 |
| 9  | f9  | f25 | f41 | f57 | f73 | f89 | f105 | f121 |
| 10 | f10 | f26 | f42 | f58 | f74 | f90 | f106 | f122 |
| 11 | f11 | f27 | f43 | f59 | f75 | f91 | f107 | f123 |
| 12 | f12 | f28 | f44 | f60 | f76 | f92 | f108 | f124 |
| 13 | f13 | f29 | f45 | f61 | f77 | f93 | f109 | f125 |
| 14 | f14 | f30 | f46 | f62 | f78 | f94 | f110 | f126 |
| 15 | f15 | f31 | f47 | f63 | f79 | f95 | f111 | f127 |

FREQUENCY HOPPING SYSTEM FOR INTERMITTENT TRANSMISSION

BACKGROUND OF THE INVENTION

1. Field of the Invention

This invention relates to radio transmission systems in which a plurality of transmitters intermittently transmit short messages indicative of status of sensors associated with the transmitters and to a method of synchronization suitable for using frequency hopping carrier in such systems.

2. Description of the Prior Art

In certain types of radio transmitter systems there exist many transmitters that periodically transmit very short messages to one or more receivers. One example of such systems is burglary and fire alarm systems. In these systems, many transmitters located at different places in a building transmit messages indicative of the status of monitoring sensors to a receiver that collects the data from the sensors. Normally, the transmitters transmit supervisory status messages that are as short as feasible and the period between the transmissions is as long as feasible in order to minimize the average current drain as the transmitters in these systems are typically battery operated. In addition, short and infrequent transmissions lower the probability that the data is lost due to collisions which occur when two or more transmitters transmit at the same time. However, when an alarm condition occurs, a transmitter transmits immediately in order to convey the alarm message with little delay.

Typically, such systems transmit data at a single frequency. Thus, they are susceptible to interference and signal loss due to phenomena known as multipath fading. Consequently, the reliability of such systems is compromised or conversely, the transmitted power has to be increased to overcome the fading which results in larger power drain and shorter battery life. Besides, there usually are regulatory limits that restrict such transmitter power and thus limit the possible compensation by sheer increase of power. Since the multipath effect is highly sensitive to the frequency of the transmitted carrier, the frequency hopping spread spectrum technique has a potential to eliminate these drawbacks. However, frequency hopping systems require long acquisition time and they are typically used in two way communication applications in which all the devices are continuously synchronizing with one master device or with each other using a variety of synchronization methods as shown in some of the following references. In other cases, to ease the synchronization problem, there are employed multichannel receivers that can simultaneously receive signals at many frequencies by making the receiver broadband or by using several receivers at the same time. Generally, those solutions suffer from performance degradation or high cost or both which makes them less desirable for low cost applications that require high reliability such as security alarms.

For example according to U.S. Pat. No. 4,843,638 granted to Walters, a receiver local oscillator has a comb spectrum. This effectively makes it a wide band since each of the frequency range down-converted by the spectral components of the local oscillator will fall in the receiver passband. Consequently, the sensitivity of such receiver will be adversely affected.

In another example according to U.S. Pat. No. 5,428,602 granted to Kemppainen, each hopping frequency is monitored by a separate receiver. This is very costly and presently not suitable for low cost systems.

In another example according to U.S. Pat. No. 4,614,945 granted to Brunius et al., a system is described that allows multiple instruments to be monitored and data to be simultaneously transmitted by several radio transponders. However, in order to operate properly, the transponders have to be energized by a RF signal to begin a transmission sequence. This necessitates a radio receiver to be included in the transponder. This makes the system a two-way communications system. Such systems are inherently more complex and costly than one-way communications systems.

In yet another example according to U.S. Pat. No. 5,659,303 granted to Adair, a transmitting apparatus is described that transmits bursts of data continuously at varying time intervals and at varying frequencies. However, the apparatus as described in the preferred embodiment and associated claims, allows identical hopping pattern to be realized in the transmitters. A means is provided to offset the starting point of the variation sequence for different transmitters depending on the transmitter ID, so that the hopping sequences in various transmitters are initially offset in respect to each other. However, due to unavoidable reference frequency drifts that are different in various transmitters, the sequences may slide in respect to each other. Consequently, it is only a matter of time that the patterns of two or more transmitters will be aligned thus producing a condition for persistent collisions of the transmitted data bursts. In addition, Adair does not provide for a receiving apparatus or a method that would allow such transmitted signals with varying frequencies to be received. In the case of Adair's invention, the actual sequence used by a transmitter is not predetermined but instead it may vary with temperature and depends on the transmitter circuit design and manufacturing tolerances, therefore the signal acquisition is made even more difficult.

A serious problem that must be addressed in battery operated systems is to shorten the transmission time as much as possible by making the message preamble as short as possible in order to conserve the battery power. Therefore, the synchronization of the receiver with the transmitters is a difficult task. This problem is exacerbated in some systems such as security alarms that require some messages to be conveyed to the system immediately without waiting for the scheduled transmission time. A related problem in battery operated systems is limitation of the transmitted power to conserve the battery power. The frequency hopping system, if designed properly, can be advantageously used to combat multipath fading that is a major source of transmitted signal attenuation. Consequently, proper method and construction of the receiver is of great importance. The system design and the receiver design should be done to support each other advantageously.

For example according to U.S. Pat. No. 5,428,637 granted to Oliva, et al., a method is described to reduce the synchronization overhead in frequency hopping systems to reduce the burden of resynchronization before each separate transmission. The method is based on allocation of specific time slots for any unit that desires to transmit data and thus the method requires a two-way communications to accomplish the necessary exchange of series of reservation and acknowledge messages.

Similarly, in yet another example according to U.S. Pat. No. 5,438,329 granted to Gastouniotis et al., a two-way system is used for efficient operation of a telemetry system that is designed to allow operation in the presence of multipath fading and interference.

Patent References:

| Patent No. | Inventor | Issued | Title |
|---|---|---|---|
| 4843638 | Walters | 6/89 | "Receiver for frequency hopped signals." |
| 5428602 | Kemppainen | 6/95 | "Frequency-hopping arrangement for |

-continued

| Patent No. | Inventor | Issued | Title |
|---|---|---|---|
| 4614945 | Brunius | 9/86 | a radio communication system." "Automatic/remote RF instrument reading method and apparatus." |
| 5659303 | Adair | 8/97 | "Method and apparatus for transmitting monitor data." |
| 5428637 | Oliva | 6/95 | "Method for reducing synchronizing overhead of frequency hopping communications systems." |
| 5438329 | Gastouniotis | 8/95 | "Duplex bi-directional multi-mode remote instrument reading and telemetry system." |
| 5408506 | Mincher | 4/95 | "Distributed time synchronization system and method." |
| 4653068 | Kadin | 3/87 | "Frequency hopping data communication system." |
| 4606041 | Kadin | 8/86 | "Frequency hopping data communication system." |
| 5390166 | Rohani | 2/95 | "Method for recovering a data signal using diversity in a radio frequency, time division multiple access communication system". |
| 5546422 | Yokev | 8/96 | "Method for transmitting low-power frequency hopped spread spectrum data." |
| 5079768 | Flammer | 1/92 | "Method for frequency sharing in frequency hopping communications network." |
| 5121407 | Partyka | 6/92 | "Spread Spectrum Communications System." |

Book References:
Robert Dixon, "Spread Spectrum Systems", John Wiley and Sons, 1884, ISBN 0-471-88309-3.
Marvin K. Simon et al, "Spread Spectrum Communications, vol. 1,2,3", Computer Science Press, 1985, ISBN 0-88175-017-4.
Don J. Torrieri, "Principles of Secure Communication Systems", Artech House, 1985, ISBN 0-89006-139-4.

SUMMARY OF THE INVENTION

Accordingly, it is an object of this invention to provide a radio transmission system including many radio transmitters that use frequency hopping carrier to intermittently transmit very short messages indicative of status of sensors associated with the transmitters, and to provide a synchronization means and method that allows a frequency hopping receiver to acquire and to maintain synchronization simultaneously with all the transmitters, thus, relieving transmitters from transmitting a long preamble each time a message is transmitted that may otherwise be required if an acquisition is performed separately for each message and which would result in an excessive current drain and shortened battery life in battery operated transmitters.

It is another object of this invention to provide a method of transmission in such a system so as to improve reliability of the system in the presence of multipath fading and interference.

It is a further object of this invention to provide a method of eliminating the effect of persistent collisions in such a system that occur when two or more transmitters transmit at the same time and at the same frequency for a prolonged period of time.

It is still a further object of this invention to provide a method that allows such a system to convey the information about an abnormal sensor condition as soon as the condition occurs regardless of the transmission period of the associated transmitter.

It is still a further object of this invention to provide a method of transmission resistant to a deliberate interference and having a means to differentiate between valid and fraudulent transmissions.

According to one aspect of the invention there is provided a frequency hopping radio transmission system comprising a plurality of transmitters and associated sensors and a receiver wherein said transmitters intermittently transmit very short messages indicative of status of the sensors associated with the transmitters, wherein (1) each transmitter includes a time interval generator means to produce pulses controlling the time interval between successive transmissions, a frequency synthesizer-modulator means to generate a modulated radio frequency carrier signal wherein the frequency of the carrier changes in response to programming the synthesizer by digital data, a reference frequency oscillator providing a frequency reference from which the synthesizer derives carrier frequencies and, preferably, from which the time interval generator derives its timing, a transmitter control logic means activated in response to pulses from the time interval generator or a sensor signal indicating an abnormal condition, wherein when activated, the transmitter control logic activates and programs the synthesizer so that the transmitter carrier frequency is changed according to a predetermined frequency hopping algorithm, provides digital data indicative of the sensor status and preferably battery status, and modulates the carrier with the provided data; (2) the receiver includes a frequency selective radio receiver circuit, programmable by digital data, to receive and demodulate a transmitted carrier when the frequency of the receiver circuit is programmed according to the frequency of the carrier, and a receiver control logic means to process demodulated data, to provide system interface responsive to the received data, and to program the frequency of the frequency selective receiver circuit, wherein the control logic includes a receiver timer to measure the elapsing time, and a plurality of memory registers to hold digital data indicative of (a) the time of the next transmission occurrence for each transmitter and (b) the frequency of the next transmission occurrence for each transmitter, wherein in operation, the control logic sequentially compares the data content of the time registers with the data content of the timer and if the transmission is due from a transmitter, the control logic programs the frequency selective radio receiver circuit according to the data content in the frequency register associated with said transmitter, attempts to decode the demodulated signal, modifies the content of the time register by a number representative of the time interval between the successive transmissions for said transmitter and modifies the content of the frequency register according to a predetermined algorithm for said transmitter.

According to the second aspect of the invention, there is provided a method of transmission in the system so as to improve reliability of the system in the presence of multipath fading and interference, the method is based on arranging the frequencies available for transmission in a plurality of groups of frequencies, wherein each said group consists of a predetermined number of frequencies selected in such a way that they are approximately uniformly distributed in the entire available spectrum and separated by large but uneven frequency intervals, wherein a single message is transmitted on one or more frequencies in one group and subsequent messages are transmitted on the next frequencies in the group until all frequencies in the group are used, then a new group is selected and subsequent messages are transmitted using the frequencies from the new group and so on until all frequencies in all groups are used. Then, the process is repeated. Wherein the order in which the groups and the frequencies in the groups are selected is determined in accordance with a predetermined algorithm.

According to the third aspect of the invention, there is provided a method of minimizing the effect of collisions, the method is based on selecting the sequence to use the frequencies within each group and selecting the sequence in which the groups are used to be different for each transmitter, wherein resulting transmitter frequency sequence depends on the transmitter ID number or other number which is included in the transmitted message, so that, upon reception of a message from a transmitter, the receiver can determine what is the next frequency for this transmitter.

According to the fourth aspect of this invention, there is provided another method of minimizing the effect of collisions that can be used alone or in conjunction with the third aspect of this invention, the method comprising randomizing the time interval between transmissions individually for each transmitter and a receiver compensating for the time interval changes.

According to the fifth aspect of this invention, there is provided a method that allows such a system to convey the information about an abnormal sensor condition as soon as the condition occurs regardless of the transmission period of the associated transmitter. The method comprises of selecting an alarm frequency or preferably a group of alarm frequencies common for all transmitters. The alarm frequencies are used by the transmitters when an alarm or an abnormal sensor condition occurs, wherein when such a condition occurs in a transmitter, the transmitter transmits the messages sequentially on the alarm frequencies for a predetermined period of time after which the transmitter resumes transmissions according to the sequence before the alarm condition, wherein the receiver monitors the alarm frequencies during the time between the reception of scheduled messages from the transmitters.

According to the sixth aspect of this invention there is provided a method that allows the receiver to verify quickly whether the received message belongs to one of the transmitters associated with this receiver or some other spurious source without waiting for a complete message transmission. The method is based on encoding the transmitted pattern by interleaving the transmitted data with a predetermined pattern that can be decoded by the receiver without the reception of the entire message. Equivalently, the receiver can monitor other unique features of the received signal, for example modulation index or format, to accomplish that.

These and other objects, advantages and features of this invention will be apparent from the following detailed description of illustrative embodiment that is to be read in connection with the accompanying drawings.

DETAILED DESCRIPTION

Figure 4:
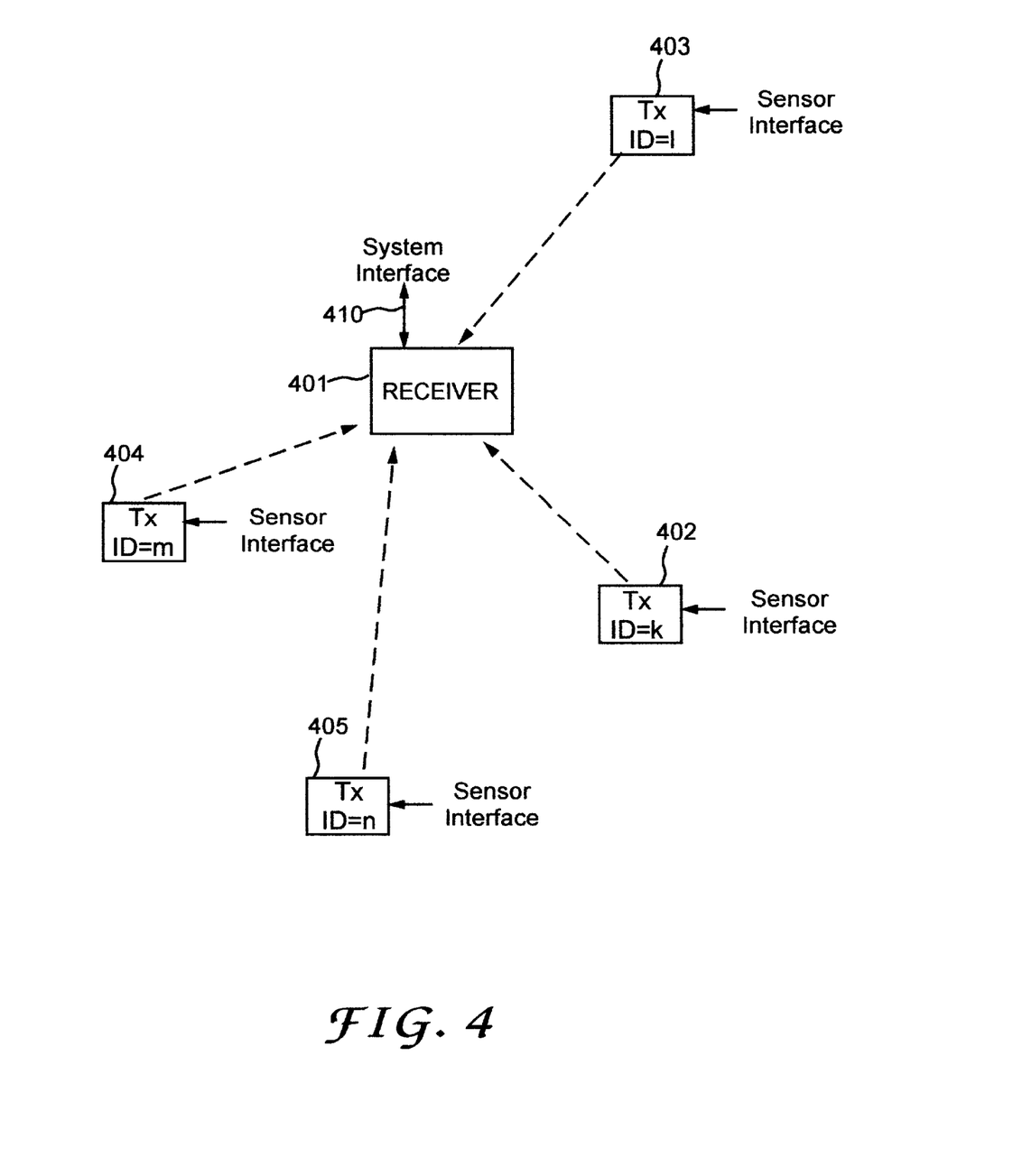
FIG. 4 is a block diagram depicting the frequency hopping system including many transmitters and a receiver.

Referring to FIG. 4, the frequency hopping system includes a radio receiver 401 and a plurality of radio transmitters 402, 403, 404 and 405. The radio receiver includes a system interface 410 through which the receiver can be connected to a variety of interface equipment, a controller, or a computer. Each transmitter includes a sensor or an operation to be monitored. Each transmitter are not connected to each other and do not receive messages back from the receiver. The transmitters transmits messages when they need to without any regard to other transmitters, as the transmitters are not synchronized with each other.

Figure 1:
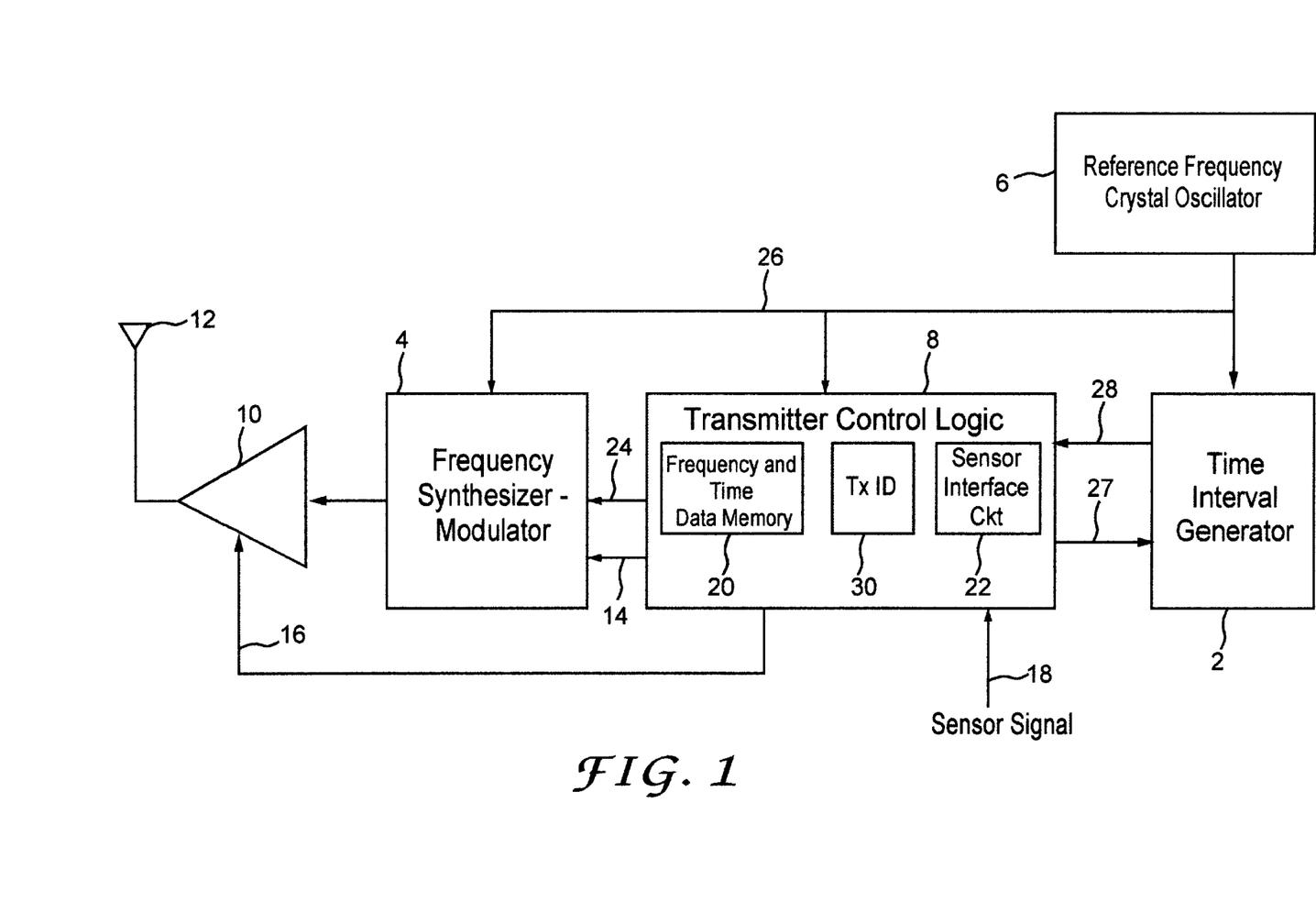
FIG. 1 is a block diagram of a transmitter according to a preferred embodiment of the present invention.

Referring to FIG. 1, the transmitter includes a reference frequency crystal oscillator 6 to produce a stable frequency on line 26, a time interval generator 2 establishing a time base to produce pulses on line 28 activating the transmitter, a frequency synthesizer-modulator 4 to produce a radio frequency carrier modulated by modulation data fed to the synthesizer via line 24 wherein the frequency of the carrier is programmed to a desired value via plurality of lines 14, transmitter control logic 8 to activate and program the synthesizer-modulator 4 via plurality of lines 14 when the logic is activated by a pulse from the time interval generator or by an abnormal signal indication on a sensor signal input line 18, an amplifier 10 to amplify the radio carrier provided by the synthesizer when the amplifier is activated by the control logic 8 via line 16, and an antenna 12 to radiate the power delivered by the amplifier. The control logic 8 includes a frequency and time data memory register 20 to hold information used to determine the time and the frequency of next transmission, and a sensor interface circuit 22 to accept the sensor signal and detect an abnormal signal condition, and to convert the sensor signal to a digital format suitable for transmission. The transmitter logic also includes a storage means 30 to store a transmitter ID number to differentiate this transmitter from other transmitters. The transmitter control logic, in some systems, can be realized based on a microprocessor, in some other systems, a specialized component may be used.

In operation, during the time between transmissions, the transmitter is in a standby mode in which the amplifier 10 and synthesizer-modulator 4 are not active and, preferably, the control signals turn off the power from these circuits in order to minimize the standby current of the transmitter. The transmitter control logic 8 is in a standby mode in which the most of the circuits are inactive and some or most of the circuitry can be powered down with the exception of the circuits supporting critical finctions; (a) the sensor interface circuit 22 that detects an abnormal signal condition and produces a binary signal that is logically combined with the signal 28 produced by the time interval generator so that when either a pulse or abnormal condition occurs the rest of the transmit logic circuitry is activated or powered up, (b) the frequency and time data memory 20 that has to retain the data during the period between transmission and consequently either it has to be a nonvolatile type or it has to be powered up during the period between transmissions. Upon activation, the control logic 8 determines the activation source by reading signals 28 and 18.

When the logic 8 is activated by a pulse 28 from the time interval generator the following sequence of events occurs. First, the logic reads the frequency data memory and produces a data packet that includes the sensor status, the transmitter ID number and other data such as battery status. Then, the logic activates and programs the synthesizer-modulator 4, activates the amplifier 10 and sends the packet to the modulator via line 24. After completion of each transmission, the transmitter logic sets the transmitter in the standby mode until activated again by a pulse on line 28 or a sensor abnormal condition indicated on line 18.

In the preferred embodiment the transmission of a packet can be repeated a predetermined number of times at separate frequencies, wherein the number of repetitions is chosen according to application needs and, wherein the frequencies are determined by the transmitter logic according to an algorithm described later in details. This way it is possible for the receiver to receive some repeated packets even if the other packets are lost due to frequency selective fading caused by multipath or due to interference.

When a sensor abnormal condition occurs, the sensor interface circuit 22 produces an active level of the signal indicative of the sensor abnormal level which activates the transmitter via a combinatorial logic circuit that combines the sensor abnormal level signal with the pulses from the time interval generator. When activated this way, the transmitter control logic 8 produces a data packet that includes the sensor status, then the logic activates and programs the synthesizer-modulator 4, activates the amplifier 10, and sends the packet to the synthesizer-modulator. In the preferred embodiment, the transmission of the alarm packet is repeated a predetermined number of times using a plurality of predetermined alarm frequencies in such a way that the transmission frequency is changed after each single packet transmission according to a predetermined fixed sequence. In the preferred implementation, when the alarm packets are transmitted, the time intervals between transmissions are minimal; when one transmission is completed, the transmitter immediately programs to the next frequency and repeats the packet transmission, etc. In the preferred embodiment there are eight frequencies used for this purpose, as described below. It should be noted that the existence of the predetermined alarm frequencies is not necessary albeit advantageous. In an alternative design, the transmitter may follow the normal hopping pattern but an increased rate repeating the alarm message a predetermined number of times. The essence of the idea is that the alarm message being infrequent can afford a much greater transmission overhead and can be repeated many times. If the alarm message is transmitted at fewer frequencies, a faster response of the receiver will be observed on average.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence; thus, normal operation is restored.

In the preferred embodiment, the use of frequencies is determined as follows. First, the entire available spectrum is divided into a plurality of channels. The number of channels depends on the available spectrum and the receiver bandwidth. In the preferred embodiment, a 26 MHz bandwidth is divided into 173 channels, each channel having 150 kHz.

Then 8 channels are selected so that they are separated by large but uneven frequency intervals. Wherein, the large interval is defined here as comparable to the coherence bandwith of the transmission channel. The large separation improves probability that if one of the channels is faded due to the multipath, the next channel is not faded. The uneven separation ensures that a single harmonic interference does not interfere with all channels. In the preferred embodiment, these channels are reserved for the transmission of abnormal sensor status and will be referred to as alarm frequencies. These frequencies are excluded from use if the sensor status is normal. In addition, channels on each side and immediately adjacent to each alarm frequency are also excluded from use in order to minimize interference with the alarm frequencies by the transmitters transmitting status messages. Thus, total number of 24 frequencies is reserved. From the remaining 149 frequencies, 128 frequencies are selected in an arbitrary but preferably non-uniform way and assigned indexes from 0 to 127 in such a way that a smaller index corresponds to a lower frequency. Then the frequencies are organized in a matrix in the following way. There are 8 columns and 16 rows in the matrix. The frequencies in the first column are from $f_0$ to $f_{15}$, in the second column from $f_{16}$ to $f_{31}$, and so on. This way, the frequencies in the first row are $f_0$, $f_{16}$, $f_{32}$, $f_{48}$, $f_{64}$, $f_{80}$, $f_{96}$, $f_{112}$, the frequencies in the second row are $f_1$, $f_{17}$, $f_{33}$, $f_{49}$, $f_{65}$, $f_{81}$, $f_{97}$, $f_{113}$, and so on. Consequently, the frequencies in each row are separated by large and uneven frequency intervals. Referring to FIG. 3b the frequency matrix 300 has eight columns numbered 0 to 7 and 16 rows numbered 0 to 15. This way of organizing the matrix of frequencies is the same for each transmitter and the receiver. However, in the preferred embodiment, the sequence in which these frequencies are used is different for different transmitters. The following is the description how this is accomplished in the preferred embodiment. Each transmitter includes two pseudo random sequence generators, wherein a pseudo random sequence generator is based on a linear feedback shift register, wherein some outputs of the shift register are fed back to an EX-OR (Exclusive OR) gate whose output is connected to the register input. For a certain combination of the outputs that are fed to the EX-OR gate, the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers are N digits long and each number differs from all the other numbers in the sequence; the numbers range from 1 to $2^N-1$. Such pseudo random generators are known to the skilled in the art and do not require additional description. The first generator is based on a three-bit shift register with feedback taken from the first and the last bit. This register produces a sequence of seven numbers, wherein each number has three digits. The numbers change from 1 to 7.

Figure 3A:
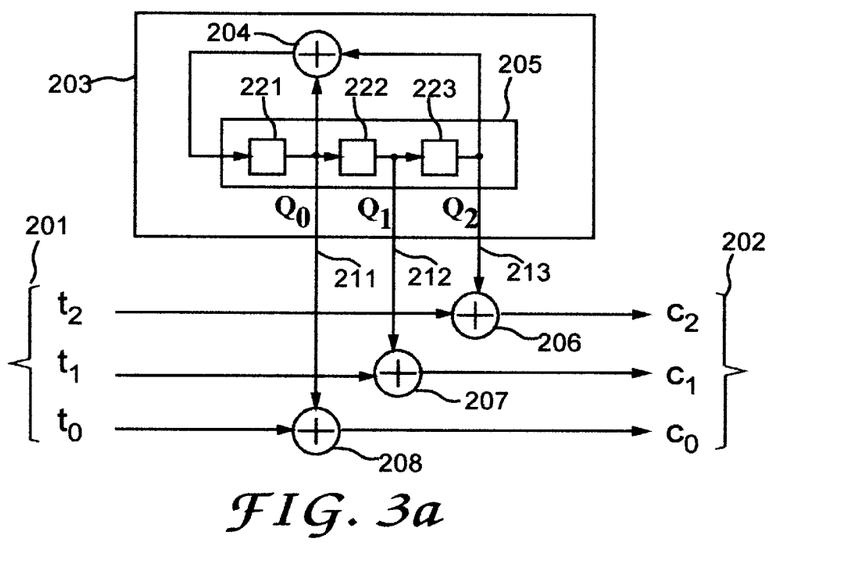
FIG. 3a is a block diagram of a preferred implementation of a sequence generator used to address column of a frequency matrix.
Figure 3B:
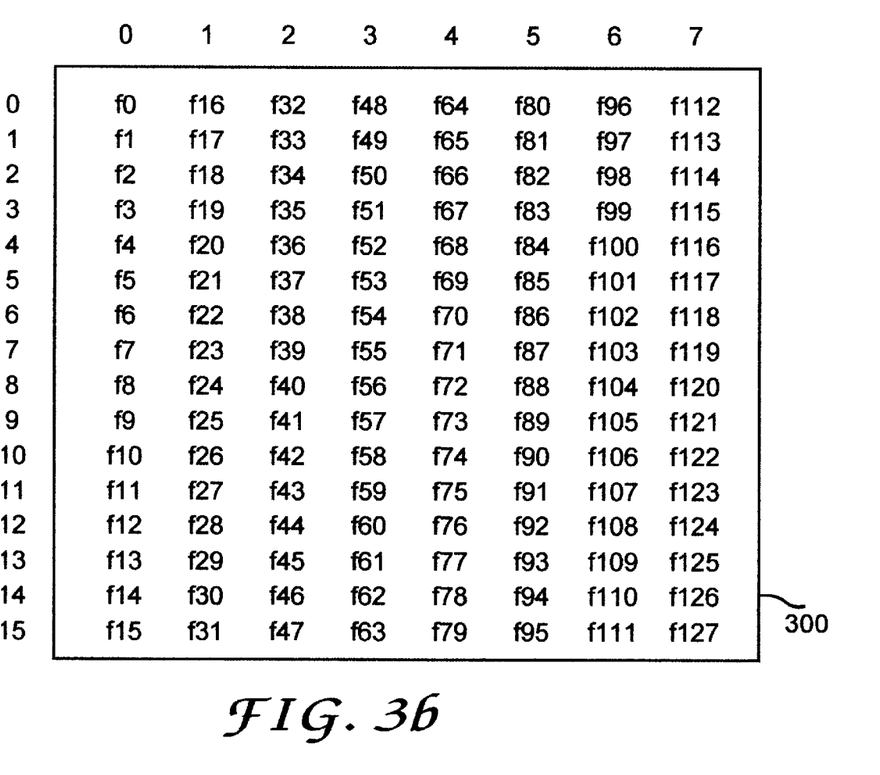
FIG. 3b is a preferred implementation of the frequency matrix.

Referring to FIG. 3a, the pseudo random sequence generator 203 consists of a shift register 205 and EX-OR gate 204. The shift register 205 is composed of three stages 221, 222, and 223 having three outputs $Q_0$ 211, $Q_1$ 212 and $Q_2$ 213 respectively. The feedback is taken from outputs $Q_0$ and $Q_2$. The three least significant bits of the transmitter ID $\{t_0, t_1, t_2\}$ 201 are combined with the output of the pseudo random sequence generator $\{Q_0, Q_1, Q_2\}$ using EX-OR gates 206, 207, 208. The result is the column address $\{C_0, C_1, C_2\}$ 202.

Assuming that the initial state of the shift register is binary 111 (decimal 7), the produced sequence is {7, 3, 5, 2, 1, 4, 6}. These numbers are then combined with the last three bits of the transmitter ID using bit by bit EX-OR operation; i.e. the last bit of the transmitter ID ($t_0$) is combined with the last bit of the random number ($Q_0$), etc. This way produced new sequence has numbers ranging from 0 to 7 the order of which depends on the last three bits of the transmitter ID. Thus, 8 distinct (permutated) sequences of numbers are created. These sequences are used to address the columns of the frequency matrix. For example, if the last digits of the transmitter ID are 000, then the columns are selected in the order 7, 3, 5, 2, 1, 4, 6, i.e. the sequence is not altered. If the last three digits of the transmitter ID are 001, then the columns are selected in the order 6, 2, 4, 3, 0, 5, 7; if the last three digits of the transmitter ID are 010, then the columns are selected in the order 5, 1, 7, 0, 3, 6, 4; etc.

In the preferred embodiment, the second pseudo random sequence generator has 4 bits; the feedback is taken from the first and the fourth bit. The resulting four bit numbers are combined using bit by bit EX-OR operation with the next 4 digits of the transmitter ID i.e. with the bits fourth, fifth, sixth and seventh to produce 16 sequences of numbers varying from 0 to 15. The resulting new sequences are used to address the rows of the frequency matrix. The column address is changed faster than the row address; the column address is changed first until all seven numbers of the column address sequence are used, then the row address is changed then the column address changes are repeated etc. It is apparent, that any two sequences are quite different even though the ID number is changed only on one position. This is advantageous since it lowers the probability of persistent collision that may happen if two or more transmitters transmit at the same time and at the same frequency for a prolonged time. Using the method of constructing hopping frequencies described above, 128 different sequences are created. This way the probability of persistent collision is small even in systems with great concentration of transmitters. It should be stressed that using the sequences as described ensures that the persistent collision is not possible since the frequencies in any arbitrary pair of sequences do not coincide persistently regardless of the relative shift of the sequences.

It should now be also apparent, that this way or organizing and using the frequencies ensures that the successive transmissions from a transmitter will occur on frequencies that are always separated by large and uneven frequency intervals. The large separation improves probability that if one of the channels is faded due to the multipath, the next channel is not faded. The uneven separation ensures that a single harmonic interference does not interfere with all channels.

For each transmitter, the future frequency can be predicted based on just one partially received message since each message includes the transmitter ID based on which the receiver can determine the content of the row and column address generators for the current frequency. It is only necessary to know the last 7 digits of the transmitter ID. These digits are placed toward the end of the message in the preferred embodiment so that in case when the receiver begins reception of the transmitted message starting in the middle of the message, the transmitter ID can still be recovered and thus the next frequency can be predicted.

In some applications, this number of sequences my not be sufficient. In such cases the number of sequences can be extended to a larger number using other techniques, some of which were extensively studied and are described in the available literature. The number of available sequences for column selection is large and equals 8!=40320. Similarly the number or possible sequences for row selections is 16! or approximately 2E13. However, the method described above is preferred for its simplicity and the unique properties or orthogonality of all sequences. The degree of orthogonality indicates how many hits (frequency agreements) there may be between two sequences upon any relative cyclic shift of the sequences. In a perfect design, for any two sequence that use the same set of frequencies, there would be only one hit. I.e. if upon any cyclic shift of two sequences, a position is found in which the same frequency is present in both sequences, then the frequencies in all other positions would differ. The sequences produced in a manner as described in the preferred embodiment are orthogonal in that sense. Although perfect orthogonality is not necessary for proper operation of the system, it is desirable since it reduces the probability of lost packets due to collisions. However, it should be apparent that other ways of arranging the frequencies and using this method of randomizing could be created.

Normally, the time intervals between transmissions are controlled by a quartz crystal and, ideally their nominal values are the same for all transmitters, however in the preferred embodiment, the time intervals are perturbed by predetermined small time increments delta T to further randomize the transmission events and lower the probability of persistent collisions with other transmitters as well as avoiding an intentional or unintentional pulsed interference. The transmitter control logic can accomplish this by programming the time interval generator via line 26 according to a predetermined algorithm. The information about the current status of the algorithm may be included in the transmitted packet to aid the receiver operation.

In the preferred embodiment, the method of determining the time interval perturbation is based on similar technique as described in conjunction with row address generation for the frequency matrix, wherein the random sequence is used to alter the time interval between transmissions. I.e. each time a transmission is performed, a new number is generated and used to determine the time interval between the current and the next transmission. Wherein, the time randomization is accomplished by combining the output of the three-bit pseudo random generator used for column addressing in the frequency matrix with the bits eight, nine and ten of the transmitter ID. I.e. bit $Q_0$ is combined with bit $t_7$, bit $Q_1$ with bit $t_8$, etc. The resulting 3-bit numbers (max ±3) are used to determine how many delta T increments are added to the predetermined nominal value of the time between transmissions to determine the time of the next transmission. This way, an instant synchronization is possible, including the time perturbation, based on a single received message because the receiver can infer the status of the 3-bit generator based on the received frequency index and the transmitter ID number. I.e. the message contains the information about the 3-bit generator without explicit inclusion of the generator status bits in the message.

It is to be understood that the random frequency selection as described above and the time perturbation can be used together or in separation to achieve immunity to collisions. I.e. (a) a fixed frequency pattern for all transmitters and random time perturbation patterns individual for each transmitter can be used, or (b) a fixed time interval between transmission or fixed time perturbation pattern and random frequency selection individual for each transmitter can be used, or (c) frequency and time changes can be combined to enhance the system performance at the expense of complication.

In the preferred embodiment, both the transmission frequency and the time interval between transmissions are individually randomized for each transmitter.

According to another aspect of the invention, the receiver can examine the transmitted waveform looking for specific parameters such as frequency deviation, modulation type, data encoding, or specific data patterns included in the transmitted data. This is done by the receiver to differentiate between the signals from the transmitters that belong to the system and some spurious transmitters or interference. In one preferred embodiment, the transmitter interleaves the data in the transmitted packet with a predetermined pattern. The preferred pattern is repeated 01 pattern resulting in the interleaved data:

$$\ldots b_{n-1} \; 0 \; b_n \; 1 \; b_{n+1} \; 0 \ldots$$

wherein $b_i$ represents the original data bits before interleaving. In most cases, the differentiation can be done without waiting for the reception of an entire packet. If the interleaving pattern is not present, the receiver may quickly hop to examine a new frequency. This aids a faster and more reliable acquisition process during which the receiver synchronizes its time and frequency coordinates of a transmitter with which the synchronization has been lost.

Figure 2:
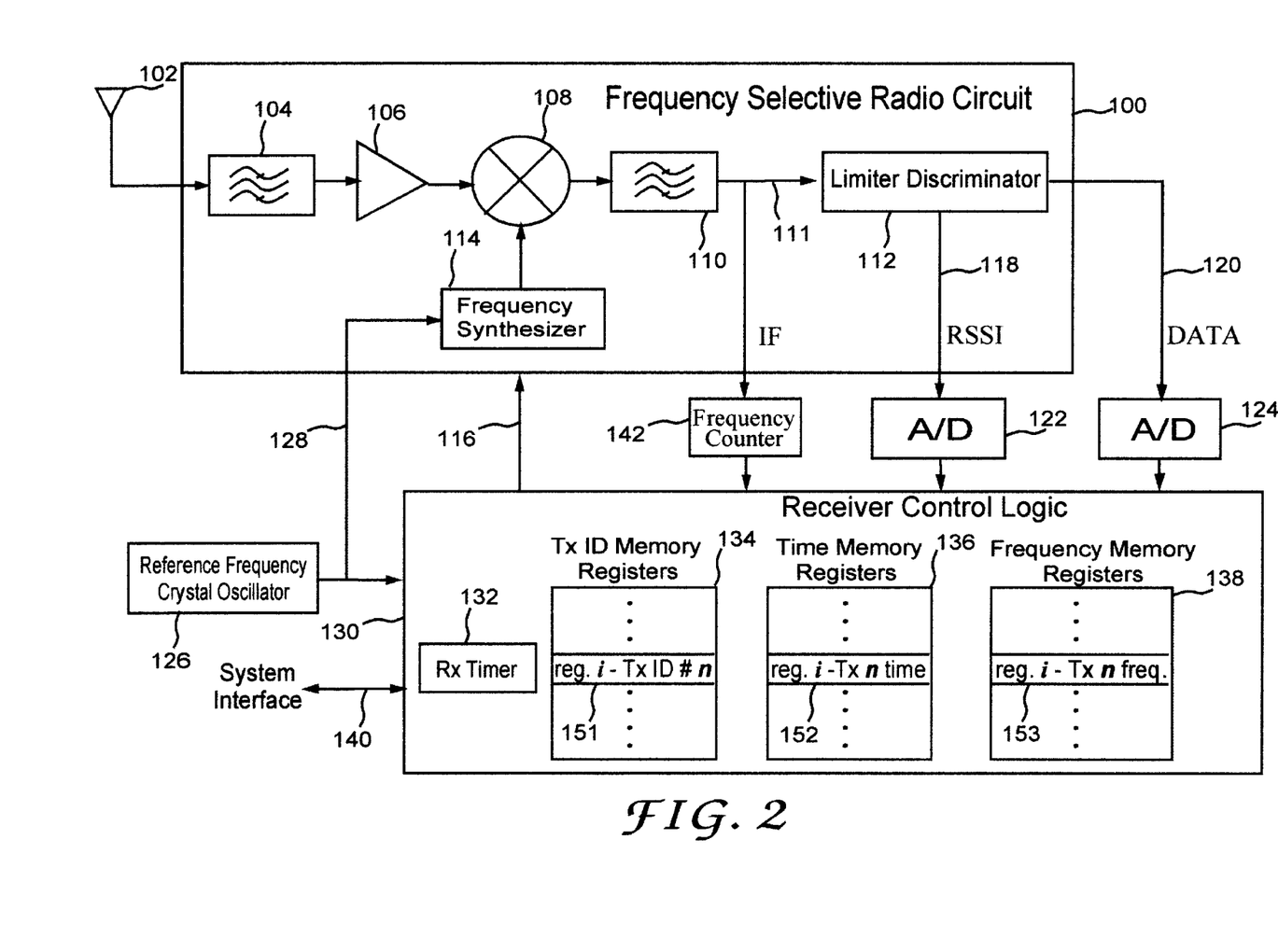
FIG. 2 is a block diagram of a receiver according to a preferred embodiment of the present invention.

Referring to FIG. 2, the receiver includes a reference frequency crystal oscillator 126 to produce a stable reference frequency on line 128 for the receiver circuits, a frequency selective radio receiver circuit 100 whose frequency is programmable via lines 116, to receive and demodulate a frequency modulated carrier when the frequency of the frequency selective receiver circuit is programmed according to the frequency of the carrier, and a receiver control logic means 130 to process demodulated data, to provide system interface lines 140, responsive to the received data, and to program the frequency of the frequency selective receiver circuit. The control logic includes a receiver timer 132 establishing a time base to measure the elapsing time. The control logic also includes: (a) a plurality of ID memory registers 134 to hold digital data indicative of ID numbers for each transmitter that belongs to the system, (b) a plurality of time memory registers 136 to hold digital data indicative of the time of the next transmission occurrence for each respective transmitter, and (c) a plurality of frequency memory registers 138 to hold digital data indicative of the frequency of the next transmission occurrence for each respective transmitter. In the preferred embodiment, the registers are organized such that an arbitrary register i 151 of the plurality of ID memory registers 134 associated with a transmitter whose ID number is n, is associated with register i 152 of the plurality of time memory registers 136 and register i 153 of plurality of frequency memory registers 138, wherein said registers 152 and 153 hold data associated with said transmitter n. The frequency selective radio receiver circuit 100 includes a RF band pass filter 104, an amplifier 106, an IF bandpass filter 110, a mixer 108, limiter-discriminator circuit 112 and frequency synthesizer 114. The RF band-pass filter selects only the desired frequency band allocated for the transmission, the mixer mixes the incoming signal with the signal produced in the frequency synthesizer and produces an IF frequency (Intermediate Frequency). The IF frequency is filtered in a narrow band filter 110 whose bandwidth is selected according to the channel bandwidth. The limiter discriminator demodulates the signal and produces baseband DATA signal 120 and an RSSI signal 118 indicative of the received signal strength. The DATA signal 120 and the RSSI signal 118 are converted to binary signals by A/D converters 124 and 122 respectively and fed to the control logic 130. The presented architecture of the frequency selective radio receiver circuit 100 is known as a superheterodyne FM receiver, it is very well known and it does not require additional explanation. The transmitted message data is extracted from the DATA signal 120 digitized by the A/D converter 124 using one of the many well-known methods for signal processing and does not require additional explanation.

In the preferred embodiment, the frequency registers 138 hold for each transmitter the state of the row and column address generators for addressing the frequency array. The frequency array is as described above and it is identical to the arrays in all transmitters. If the synchronization is obtained with a given transmitter, the states of the row and column address generators are identical with that in the transmitter. In the preferred implementation, the time registers 136 hold numbers—time of next transmission—for each transmitter representing the state of the receiver timer 132 at the time the next transmission is due from a transmitter.

In operation, the receiver control logic 130 sequentially compares the data content of the time registers 136 with the data content of the receiver timer 132 and if the transmission is due from a transmitter, the control logic programs the frequency selective radio receiver circuit 100 according to the data content in the frequency register 138 for this transmitter, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the packet was received successfully. The new content of the frequency register is determined according to the algorithm for the frequency use by the transmitters.

The new content of the time register is calculated based on the current content of the receiver timer and a number representative of the time between the current transmission and the next transmission for this transmitter, wherein said number is calculated based on the nominal value of the time between the transmissions and adjusted by the pseudo random perturbation performed according to the previously described algorithm. In addition, said number is corrected by a correction factor based on the measured difference between the transmitter time base and the time base of the receiver, wherein said difference is determined in a manner described later in details. In the preferred embodiment, the numbers representative of the time base differences are stored in the time registers 136 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions may be significant compared to the packet time. For example, if the period between the transmissions is 100 seconds and the crystal frequency error due to tolerance and temperature changes is ±20 ppm (parts per million) for the transmitter and ±10 ppm for the receiver, then the error may be as large as 3 ms. If the time for the transmission of one packet is 5 ms, then the error is significant. In order to minimize the time error accumulated during the long time between the transmissions, the receiver can store the time difference between the ideal and the actual time of the packet reception and use the difference to predict more accurately the next transmission time. For example, if the timer resolution is 0.3 ms, then the next transmission time can be predicted with accuracy 0.3 ms, providing that the temperature does not change appreciably over 100 s period. This represents an improvement of an order of magnitude. I.e. the receiver can program its frequency 0.3 ms in advance to each new frequency, examine it for the duration of the packet, then program to the next frequency and so on.

During the acquisition, when the time error is not known, the receiver needs to tune to the first frequency at least 3 ms in advance. Then, the receiver monitors the received signal by observing the RSSI signal 118 and DATA signal 120. If during the next 6 ms no valid signal is present, the receiver programs to the next frequency 3 ms in advance and so on. To avoid this acquisition problem, the receiver can include a frequency error detection means as described below.

In the preferred embodiment, the receiver includes a frequency error detection means 142 that is preferably implemented as a simple digital counter, in order to detect the frequency error in the received signal in respect to the receiver reference frequency by measuring the frequency error of the intermediate frequency signal 111. In addition, in the transmitter, the transmitted carrier frequency and the time interval generator timing are derived from the same source and in the receiver, the receiver frequency and the receiver timer are derived from the same reference. In operation, the receiver can measure the frequency difference between the transmitted carrier and the receiver frequency and use the measured error to determine the difference between the transmitter reference frequency and the receiver reference frequency based on just one partially decoded message. The frequency difference measurement is accomplished in the following way. Assuming that the transmitter frequency accuracy is ±20 ppm and the receiver is ±10 ppm, carrier frequency is 915 MHz and IF frequency is 10.7 MHz, the absolute maximum error between the receiver frequency synthesizer and the received carrier can be as much as 2760 Hz (915E6*20E-6+925.7E6*10E-6). I.e. the resulting IF frequency is offset from its nominal value by this amount. This represents 260 ppm of the nominal IF frequency. An ordinary frequency counter with a time base accuracy determined by the receiver crystal oscillator, i.e. ±10 ppm can detect this error and measure it with good accuracy. The accuracy should be better than ±110 Hz (1/26 of the maximum error). Based on the measured frequency error, the relative frequency offset is calculated and the time correction factor for each transmitter is adjusted accordingly. For example, if the measured error is +1380 Hz then the relative frequency error is approximately equal to +15 ppm. If the nominal value of the time interval between two consecutive transmissions is 100 seconds, then the required correction is +1.5 ms if the receiver uses high injection, i.e. the frequency of the synthesizer in the receiver is nominally equal to the received frequency plus the IF frequency, and −1.5 ms if low injection is used.

In the preferred embodiment, the time base correction factor stored for each transmitter is also used to adjust the center frequency of the receiver and thus aid the reception of the transmitted packets, thus lowering the requirements for the length of the preamble included in each packet for the purpose of carrier and data timing acquisition. This is accomplished by adjusting the receiver frequency momentarily just prior to the reception of the packet from a transmitter from which a packet is due.

In operation, the receiver scans the alarm frequencies during the time when it is not occupied with the scheduled reception from the transmitters or checking the time registers. Also the receiver scans all the available frequencies in addition to the alarm frequencies. During the scan, the receiver uses RSSI signal to detect if there is an energy transmitted on a current frequency; if so then the receiver determines if the transmitted pattern is valid by detecting the interleaved pattern in the message or other unique properties of the modulated carrier. If the energy is not present or the pattern is not valid, the receiver will quickly proceed to examine the next frequency. Only if the pattern is valid, the receiver will stay on this frequency and try to decode the message. This way all the alarm frequencies are examined several times per second ensuring that the receiver can receive the alarm message with a minimum delay. Also, the scan of all available frequencies is fast; the synchronization can be regained faster and more reliably because the receiver will not waste much of the time for an examination of very weak or spurious signals.

In the preferred embodiment, when a transmitter is powered up, for example after a battery replacement, it enters a power-up mode during which a predetermined number of packets are transmitted on the alarm frequencies in a way similar to the transmission of alarm packets. In the power-up transmission sequence, each packet includes a number that indicates how many packets the transmitter will transmit in this mode before entering a normal mode of operation. This way, the receiver can synchronize with the transmitter just after a single packet reception by calculating when the first transmission will occur in the normal mode.

In the preferred embodiment, the transmitter ID numbers for each transmitter stored in the receiver ID memory registers 134 are acquired and stored by the receiver during a process of log-in. Each new transmitter to be logged-in is placed in a close proximity to the receiver and then powered up. A very high level of the received signal ensures that the new transmitter signal is not mistaken for another transmitter. A successful log-in is confirmed by the receiver using an audio or a visual indicator that can be included in the receiver or in the system controller connected to the receiver via system interface 140. The receiver may reject the transmitters that can cause persistent collisions i.e. if its ID number has the last 10 digits identical to another transmitter already present in the system.

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

What is claimed is:

1. A radio transmission system comprising of a radio receiver and a plurality of radio transmitters using frequency hopping modulation to intermittently transmit messages indicative of a status of operation associated with the transmitters;

wherein each said transmitter includes a control logic means to change the carrier frequency according to a predetermined pattern and a time interval generator means for activating said transmitter at predetermined time intervals, said intervals may be set at a predetermined nominal value or changed according to a predetermined pattern; and wherein said receiver includes a frequency selective radio circuit that can be programmed to a desired frequency to receive and demodulate the transmitted carriers; and wherein said receiver includes a plurality of digital counters or memory registers means to hold data indicative of (a) the time of the next transmission occurrence for each said transmitter and (b) the frequency of the next transmission occurrence for each said transmitter, and wherein said receiver includes a receiver control logic means to change the receiver frequency according to said data in said digital counters or memory registers and to change said data in said digital counters or memory registers in response to the received messages; and wherein, said receiver control logic is operative to change the data in said digital counters or memory registers based on the time of arrival, the carrier frequency and the content of a message received from a transmitter for subsequent use for the determination of the time and frequency of the future transmissions for said transmitter, said determination is made individually for each transmitter of said plurality of transmitters, thus allowing the receiver to receive messages from many unsynchronized frequency hopping transmitters.

2. A frequency hopping radio transmission system according to claim 1, wherein said frequency patterns in said transmitters are predetermined in such a way that the successive frequencies are arranged in groups, said groups having predetermined number of frequencies chosen in such way that said frequencies in each said group are distributed over the entire available bandwidth and are separated by large but preferably uneven frequency intervals.

3. A frequency hopping radio transmission system according to claim 1, wherein said frequency patterns are predetermined individually for each transmitter.

4. A frequency hopping radio transmission system according to claim 3, wherein said frequency patterns are predetermined individually for each transmitter based on a transmitter ID number, said number or a number derived from it being included in the transmitted messages, and wherein said frequency patterns are obtained by a method comprising:

arranging the available frequencies in a matrix, wherein said matrix have a predetermined number $N_R$ of rows and a predetermined number $N_C$ of columns, wherein the frequencies in the rows are distributed over the entire available bandwidth and separated by large and preferably uneven frequency intervals;

producing a first pseudo random number in a first pseudo random generator having a predetermined number $G_C$ of bits and encode said first number with a predetermined number of bits of the transmitter ID by processing said generator bits with said transmitter ID according to a predetermined algorithm to produce column address for said matrix;

producing a second pseudo random number in a second pseudo random generator having a predetermined number of $G_R$ bits and encoding said second number with a predetermined number of bits of the transmitter ID by processing said generator bits with said transmitter ID according to a predetermined algorithm;

changing the column address until all possible addresses are selected, then changing the row address to the next value, then repeating the sequence of column address changes etc.

5. A frequency hopping radio transmission system according to claims 1 or 3 wherein said time intervals are changed according to predetermined patterns.

6. A frequency hopping radio transmission system according to claim 3, wherein an information is included by each said transmitter in the transmitted messages that identifies which patterns are used by said transmitter.

7. A frequency hopping radio transmission system according to claim 6, wherein said individual determination for each transmitter is based on a transmitter ID or another number derived from or associated with said ID.

8. A frequency hopping radio transmission system according to claim 7, wherein said predetermined patterns are based on identical pattern generators in each transmitter, Said individual determination is obtained by modifying the output of said pattern generator in each transmitter.

9. A frequency hopping radio transmission system according to claim 5, wherein an information is included by each said transmitter in the transmitted messages that identifies which patterns are used by said transmitter.

10. A frequency hopping radio transmission system according to claim 9, wherein said individual determination for each transmitter is based on a transmitter ID or another number derived from or associated with said ID.

11. A frequency hopping radio transmission system according to claim 10, wherein said predetermined patterns are based on identical pattern generators in each transmitter, Said individual determination is obtained by modifying the output of said pattern generator in each transmitter.

12. A frequency hopping radio transmission system according to claim 5, wherein information about the current status of said time interval pattern is preferably contained in the transmitted messages.

13. A frequency hopping radio transmission system according to claim 5, wherein said time interval pattern and said frequency pattern in a transmitter are based on a same pattern generator and said frequency pattern is obtained by a first modification of the generated pattern and said time interval pattern is obtained by a second modification of the generated pattern.

14. A frequency hopping radio transmission system according to claim 5, wherein said patterns are predetermined individually for each transmitter.

15. A frequency hopping radio transmission system according to claim 14, wherein an information is included by each said transmitter in the transmitted messages that identifies which patterns are used by said transmitter.

16. A frequency hopping radio transmission system according to claim 15, wherein said individual determination for each transmitter is based on a transmitter ID or another number derived from or associated with said ID.

17. A frequency hopping radio transmission system according to claim 16, wherein said predetermined patterns are based on identical pattern generators in each transmitter, Said individual determination is obtained by modifying the output of said pattern generator in each transmitter.

18. A frequency hopping radio transmission system according to claim 14, wherein information about the current status of said time interval pattern is preferably contained in the transmitted messages.

19. A frequency hopping radio transmission system according to claim 14, wherein said time interval pattern and said frequency pattern in a transmitter are based on a same pattern generator and said frequency pattern is obtained by a first modification of the generated pattern and said time interval pattern is obtained by a second modification of the generated pattern.

20. A frequency hopping radio transmission system according to claim 1, wherein messages requiring immediate attention are repeatedly transmitted by a transmitter on one or more frequencies for a predetermined time duration or a predetermined number of times immediately upon occurrence of an extraordinary condition requiring immediate attention, regardless of the status of the time interval generator of said transmitter.

21. A frequency hopping radio transmission system according to claim 20, wherein when powered-up, said transmitter repeatedly transmits a predetermined message on one or more of said alarm frequencies for a predetermined time duration or predetermined number of times.

22. A frequency hopping radio transmission system according to claim 21, wherein each transmitted message in the power-up mode includes a number indicative of the total number of transmissions remaining before the transmitter ends the power-up transmissions and enters a normal mode of operation.

23. A frequency hopping radio transmission system according to claim 20, wherein a new transmitter is added to the system using a method comprising:

activating or powering up the transmitter to be added to the system, wherein said transmitter upon activation or powering up sends messages as described in claim 6; and receiver detecting said messages and responding by storing said transmitter ID number in a memory register and by allocating time and frequency memory registers for said transmitter for subsequent use during operation, wherein the receiver is aided to obtain protection from a spurious log-in by bringing the transmitter to a close proximity to the receiver and the receiver using the high signal strength of the received carrier as a basis to differentiate valid new transmitter messages from spurious transmissions.

24. A frequency hopping radio transmission system according to claim 1, wherein the transmitters are selected to operate in the system based on the differences in their ID numbers.

25. A frequency hopping radio transmission system according to claim 1, wherein said receiver detects and measures predetermined unique properties of the transmitted signal, and said receiver uses the result of the measurement to quickly differentiate between the signals from the transmitters that belong to said system and other signals and interferences without having to decode the entire message.

26. A frequency hopping radio transmission system according to claim 1, wherein the relative timing error between the time interval generator in a transmitter and the timing in said receiver is detected and compensated in the receiver by measuring the difference between the nominal and actual time between transmissions for a transmitter and using said difference to compute the next transmission time for said transmitter; wherein said detection and computation is done individually for each transmitter.

27. A frequency hopping radio transmission system according to claim 1, wherein the time interval generator timing and transmitted carrier frequency in said transmitters is derived from a same crystal oscillator in the transmitter; and wherein the receiver frequency and time interval generator timing are derived from a same crystal oscillator in the receiver; and wherein said receiver includes a frequency counter means to detect relative frequency error between the received carrier frequency and the receiver frequency; and wherein said receiver uses said measured frequency error to compute the timing error in the time interval generator in said transmitter and to more accurately determine the time of the next transmission from said transmitter, wherein such determination is done individually for each transmitter, and wherein preferably the measured frequency error is also used to adjust the receiver center frequency to aid the reception of the transmitted data individually for each transmitter.

28. A frequency hopping radio transmission system according to claim 1, wherein a predetermined number of alarm frequencies is assigned for the purpose of transmitting messages requiring immediate attention, said messages are repeatedly transmitted by a transmitter on one or more of the frequencies for a predetermined time duration or a predetermined number of times immediately upon occurrence of an extraordinary condition requiring immediate attention, regardless of the status of the time interval generator of said transmitter.

29. An apparatus for receiving digital data from a plurality of frequency hopping transmitters comprising a receiver;

said receiver including a frequency selective radio circuit that can be programmed to a desired frequency to receive and demodulate the transmitted carriers; and said receiver having a plurality of (a) time registers for holding data indicative of the next transmission occurrence separately for each said transmitter and (b) frequency registers for holding data indicative of the frequency of the next transmission occurrence separately for each said transmitter; and said receiver having a timer to measure the elapsing time; and said receiver using said receiver timer and said time and frequency registers to control said receiver frequency in the steps comprising:

(1) said receiver determining which transmitter is the next transmitter to transmit a message on basis of the content of said time registers and changing said receiver frequency to the next frequency of said next transmitter at such time in advance before said message is transmitted as to allow for the reception of entire said message, wherein said frequency is determined on basis of the content of said frequency register associated with said next transmitter; and (2) said receiver, upon complete or partial reception of a message from a transmitter, changing the data in said frequency register associated with said transmitter to indicate the next frequency for said transmitter according to a predetermined algorithm, and changing current content of said time register associated with said transmitter, wherein said time register change is based on the time of the arrival of the received message and a number representative of the time interval between the current and the next transmission for said transmitter according to a predetermined algorithm; and wherein (3) when said receiver fails to detect the transmitted signal at the due time due to signal fading or interference, said receiver changes the data in said frequency register associated with said transmitter to indicate the next frequency for said transmitter according to a predetermined algorithm, and said receiver changes the data in said time register associated with said transmitter, said time register change is based on the current status of said time register associated with said transmitter and the time interval between the presently due transmission and the next transmission determined according with a predetermined algorithm; and (4) said receiver using the available time between transmissions to sequentially scan other frequencies of a plurality of frequencies available for transmission in an attempt to receive signals from transmitters with which synchronization has been lost, and wherein when such a signal is detected, updating said time register for said transmitter according to step (2) and thus restoring synchronization; and (5) said receiver repeating steps 1 through 5.

30. An apparatus according to claim 29, wherein said receiver has a means to replicate the frequency hopping patterns individually for each said transmitter and said patterns are different for each said transmitter and wherein said replication is based on the data content in the received messages that identifies which pattern is used by said transmitter from which said data is received.

31. An apparatus according to claim 30, wherein said replicated frequency patterns are predetermined individually for each transmitter based on the transmitter ID number, said number or a number derived from it being included in the transmitted messages, and wherein frequency hopping patterns are determined by a method comprising:

arranging the available frequencies in a matrix, wherein said matrix has a predetermined number $N_R$ of rows and a predetermined number $N_C$ of columns, wherein the frequencies in the rows are distributed over the entire available bandwidth and separated by large and preferably uneven frequency intervals;

producing a first pseudo random number in a first pseudo random generator having a predetermined number $G_C$ of bits and encode said first number with a predetermined number of bits of the transmitter ID by processing said generated bits with said transmitter ID according to a predetermined algorithm to produce column address for said matrix;

producing a second pseudo random number in a second pseudo random generator having a predetermined number of $G_R$ bits and encoding said second number with a predetermined number of bits of the transmitter ID by processing said generated bits with said transmitter ID according to a predetermined algorithm;

changing the column address until all possible addresses are selected, then changing the row address to the next value, repeating a sequence of column address changes for the row, repeating column address changes for each row address,     and wherein the status of said first and second pseudo random generators for each said transmitter is kept in said frequency memory registers individually for each transmitter and adjusted individually for each transmitter.

32. An apparatus according to claim 29, wherein the time intervals between transmissions are determined individually for each transmitter and are changed in a pattern that is different for each transmitter.

33. An apparatus according to claim 32, wherein the receiver makes use of the information contained in the messages received from a transmitter about which pattern is used by said transmitter.

34. An apparatus according to claim 29, wherein said receiver is using the available time between transmissions to scan for alarm messages requiring immediate attention that may be repeatedly transmitted by transmitters on one or more frequencies according to a predetermined algorithm.

35. An apparatus according to claim 34, wherein said scan occurs over a predetermined number of alarm frequencies assigned specially for the purpose of transmitting alarm messages.

36. An apparatus according to claim 29, wherein when a receiver detects a message from a transmitter indicating that the transmitter is in power-up mode, said receiver retrieves a number contained in the message indicating how long the transmitter will be in that mode, and said receiver uses said number to determine the time of occurrence of the next normal transmission for said transmitter after the power-up sequence is finished.

37. An apparatus according to claim 29, wherein said receiver has a means to determine the signal strength of the received carrier, and wherein said receiver upon detection of a power-up sequence above a predetermined signal level from a new transmitter whose ID is not yet contained in the receiver memory responds by storing the new ID, assigning a time memory register and frequency memory register, synchronizing with said new transmitter and subsequent monitoring of said transmitter.

38. An apparatus according to claim 37, wherein the status of adding said new transmitter is indicated by the receiver using an audio or visual indicator or electrical signals on receiver interface lines.

39. An apparatus according to claim 29, wherein during the process of adding a new transmitter to the system, the receiver can reject a new transmitter whose certain digits of the ID number are identical to another transmitter already present in the system.

40. An apparatus according to claim 29, wherein said receiver detects and measures predetermined unique properties of the transmitted signal, and said receiver uses the result of the measurement to quickly differentiate between the signals from the transmitters that belong to said system and other signals and interferences without having to decode the entire message.

41. An apparatus according to claim 29, wherein the timing error between the nominal time between transmissions and the actual time between transmissions for a transmitter is measured by the receiver and used to compute the next transmission time for said transmitter, wherein said measurement and computation is done individually for each transmitter.

42. An apparatus according to claim 29 to be used in a system in which the timer time and transmitted carrier frequency in said transmitters are derived from a same crystal oscillator in the transmitter, wherein the receiver frequency and timer time are derived from a same crystal oscillator in the receiver; and     wherein said receiver includes a frequency counter means to detect relative frequency error between the received carrier frequency and the receiver frequency; and     wherein said receiver uses said measured frequency error to compute the timing error in the time interval generator in said transmitter and to more accurately determine the time of the next transmission from said transmitter, wherein such determination is done individually for each transmitter, and wherein preferably the measured frequency error is also used to adjust the receiver center frequency to aid the reception of the transmitted data individually for each transmitter.

43. An apparatus according to claim 29, wherein a valid message detection on a wrong frequency or at a wrong time triggers an alarm indicating detection of an imposter transmitter attempting to send a fraudulent message to the system.

44. An apparatus according to claim 29, wherein a detection of jamming of more than a predetermined number of frequencies or a predetermined change in the number of jammed frequencies triggers an alarm.

45. An apparatus according to claim 29, wherein a loss of a predetermined number of packets from a single transmitter triggers an alarm.

* * * * *